United States Patent [19]
Hanisch

[11] 3,864,210
[45] Feb. 4, 1975

[54] APPARATUS FOR COOLING LIQUID METALS IN ATOMIC REACTORS

[75] Inventor: Harald Hanisch, Vienna, Austria

[73] Assignee: Gebr. Boehler & Co. AG, Vienna, Austria

[22] Filed: Dec. 1, 1972

[21] Appl. No.: 311,398

[30] Foreign Application Priority Data
Dec. 13, 1971 Austria .................... 10706/71

[52] U.S. Cl.............. 176/60, 165/158, 165/175, 176/65, 176/87
[51] Int. Cl............................................. G21c 3/56
[58] Field of Search .......... 165/141, 142, 145, 158, 165/175; 176/65, 87, 60

[56] References Cited
UNITED STATES PATENTS
| | | | |
|---|---|---|---|
| 3,020,026 | 2/1962 | Peeps et al..................... | 165/141 X |
| 3,090,433 | 5/1963 | Amorosi et al.................. | 165/142 |
| 3,274,752 | 9/1966 | Huyghe et al.................. | 165/158 |
| 3,504,739 | 4/1970 | Pearce ........................... | 165/158 |
| 3,610,330 | 10/1971 | Nasser ........................... | 165/158 |
| 3,630,276 | 12/1971 | Kikin et al....................... | 165/158 |

FOREIGN PATENTS OR APPLICATIONS
1,089,816  12/1953  France ............................. 165/158

Primary Examiner—Benjamin R. Padgett
Assistant Examiner—Roger S. Gaither

[57] ABSTRACT

A device for cooling liquid metals in atomic nuclear reactors or an installation for simulating the conditions in such reactors. The liquid metal is conducted over the exterior surfaces of heat energy conducting pipes and the preferably gaseous cooling medium is conducted through said pipes, the two fluids being thus separately conducted. The pipes are mounted between a pair of parallel end plates and are open at both ends and are surrounded by a cylindrical member.

1 Claim, 1 Drawing Figure

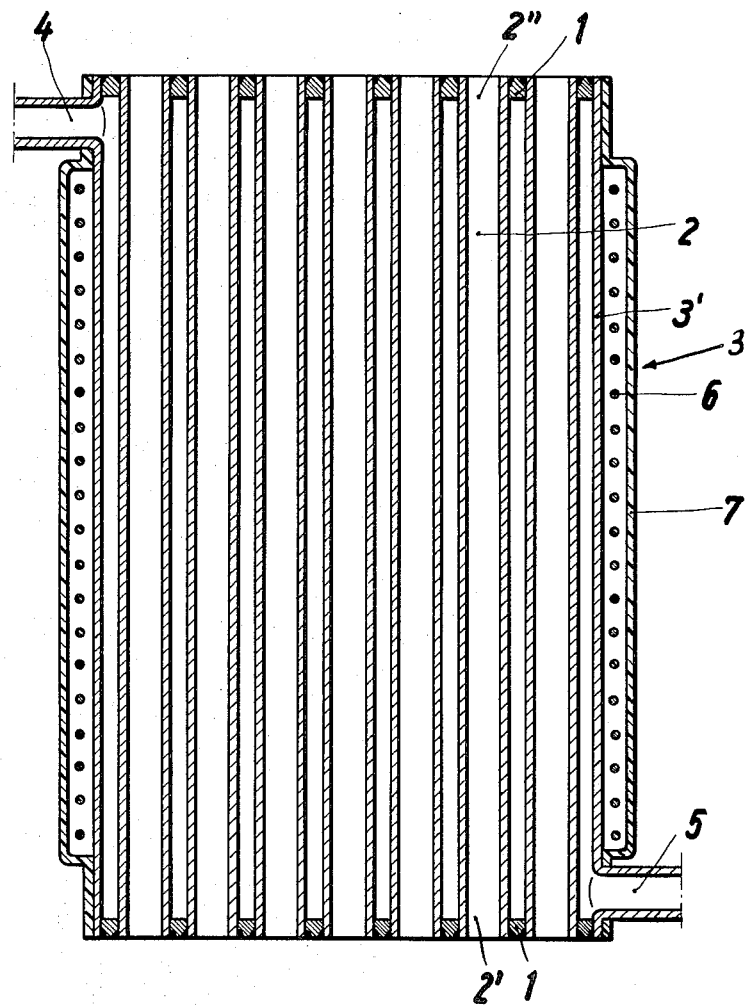

APPARATUS FOR COOLING LIQUID METALS IN ATOMIC REACTORS

BACKGROUND OF THE INVENTION

The invention concerns a device for cooling liquid metal substances in an atomic nuclear reactor or an installation for simulating the technological conditions that exist in such a reactor. In the known cooling installations for liquid-metal-cooled atomic nuclear reactors the liquid metal is generally conducted in pipes through the cooled gaseous stream. There is however only achieved in such an arrangement a low heat energy transfer into the gas. Consequently, in order to conduct from the liquid metal large amounts of heat energy it is necessary to use large quantities of cooling gas and such an installation consequently requires correspondingly large blowing installations. In such installations the pipes which conduct the liquid metal and which consist of material that is heat conductive and therefore has a temperature near the temperature of the liquid metal while the gas stream which surrounds the pipe has a substantially lower temperature, there occur large heat expansions due to the large temperature gradient present in the installation. In order to compensate for these large heat expansions it is consequently necessary to make the construction extremely complex. Consequently, the assembly of such an installation is very difficult and time consuming.

SUMMARY OF THE INVENTION

It is accordingly a primary object of the present invention to provide an installation of the above described type in which the aforementioned drawbacks are eliminated.

This object is achieved by having the liquid metal flow over the exterior sides of the heat conducting pipes and having the cooling medium which is preferably in gaseous form, fir example air, flow through the pipes so that the two fluids are conducted completely separate from each other. The cylindrical memeber which surrounds the open-ended pipes is only in contact with its inner side with the liquid metal during the cooling operation. The air flowing through the pipes is preferably pre-cooled and the outer side of the cylindrical member is preferably in direct contact with the ambient atmosphere.

BRIEF DESCRIPTION OF THE DRAWING

The invention is illustrated by way of example in the accompanying drawing which forms part of the of this application and in which the sole FIGURE illustrates schematically an embodiment of the invention in elevational cross-section.

DESCRIPTION OF A PREFERRED EMBODIMENT

Referring now to the drawing, there is illustrated a cylindrical member 3 having two end plates 1 mounted at opposite ends of the cylindrical member 3. The end plates 1 support a plurality of cylindrical open pipes 2 which are made of heat conductive material. The pipes 2 are welded to the end plates 1 at opposite ends thereof. An inlet pipe 4 is arranged near the top of the cylindrical member 3 and an outlet pipe 5 is arranged near the bottom at an opposite side of the cylindrical member 3. The inlet pipe 4 and outlet pipe 5 serve to conduct liquid metal, for example, liquid sodium, through the cylindrical member 3 wherein the passages between the pipes 2 are in communication with each other. The individual pipes 2 have lower inlet openings 2+ and upper outlet openings 2" for conducting a gaseous cooling medium, for example air. Thus the liquid metal flows over the outer sides of the heat conductive pipes 2 essentially from above downwardly in the cylindrical member 3 and thee cooling medium flows through the pipes 2 from below upwardly.

The cylindrical member 3 is provided with a heat conducting annular inner wall 3' and an outer annular wall 7 of heat-insulating material between which there is disposed an electrically conductive heating coil 6 which is connected to a source of electrical energy (non-illustrated). Consequently, the solidified metal which is present within the cylindrical member 3 can be melted by means of the heat energy emanating from the heating coil 6 prior to the beginning of the full operation of the installation. The inner wall 3" of the cylindrical member 3 and the heat conducting pipes are preferably made out of rust-free chromium nickel steel. The The outer wall 7 of the cylindrical member 3 constitutes a heat-insulating layer between the heating coil 6 and the ambient atmosphere.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A heat transferring installation for cooling liquid metals in atomic nuclear reactors or in installations simulating operative conditions of such reactors, comprising in combination, a cylindrical member having a pair of metallic confronting end plates spaced from each other;

a plurality of straight open-ended pipes of heat-conductive material which are adapted to conduct a gaseous cooling medium and which are mounted in said cylindrical member and are being supported by said end plates;

said cylindrical member having an inner and an outer wall surface and said open-ended pipe have inner and outer surfaces; the inner wall surface only being contacted by liquid metal flowing over the outer surface of said plurality of open-ended pipes through said cylindrical member during the cooling;

the outer wall surface of said cylindrical member is in contact with the ambient atmosphere;

including inlet and outlet means being mounted at opposite ends of said cylindrical member for conducting hot liquid metal in cooled liquid metal out of said cylindrical member;

said inner wall surface of said cylindrical member is formed by an inner wall made of heat conducting material and said outer wall surface is formed by an outer wall made of heat-insulating material, said outer and inner walls being spaced from each other and defining an annular space therebetween, and a heating coil disposed in said annular space for heating the liquid metal in said cylindrical member, whereby solidified metal present within the installation can be melted bysaid coil so that the liquified metal may flow through the installation.

* * * * *